Figure 4:
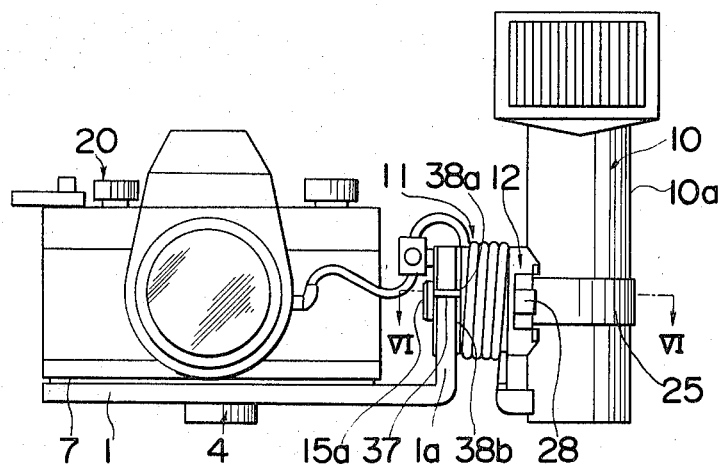

United States Patent [19]

Ueda

[11] 3,852,788
[45] Dec. 3, 1974

[54] CAMERA OUTFIT FOR CONNECTING A FLASH UNIT TO A PHOTOGRAPHIC CAMERA

[75] Inventor: Hiroshi Ueda, Nara, Japan
[73] Assignee: Minolta Camera Kabushiki Kaisha, Osaka, Japan
[22] Filed: June 12, 1973
[21] Appl. No.: 369,215

[30] Foreign Application Priority Data
July 6, 1972 Japan.............................. 47-80456
July 6, 1972 Japan.............................. 47-80457
Dec. 1, 1972 Japan.............................. 47-138581

[52] U.S. Cl................. 354/293, 354/126, 240/1.3, 248/225, 24/223, 24/224 LS, 24/224 PS, 24/201 A
[51] Int. Cl. ......................................... G03b 17/56
[58] Field of Search............ 95/11 L, 11 R; 240/1.3, 240/52.1; 248/224, 225; 24/223, 224 SB, 224 LS, 224 PS, 224 R, 201 A

[56] References Cited
UNITED STATES PATENTS
1,261,363 4/1918 Crist ................................. 248/224
2,246,457 6/1941 Schultz .............................. 248/225
3,392,427 7/1968 Lane .................................... 24/223

FOREIGN PATENTS OR APPLICATIONS
990,743 4/1965 Great Britain ...................... 240/1.3
1,104,629 2/1968 Great Britain ...................... 24/224

Primary Examiner—Robert P. Greiner
Attorney, Agent, or Firm—Wenderoth, Lind & Ponack

[57] ABSTRACT

A camera outfit for connecting a flash unit to a photographic camera including a connecting device is disclosed. The connecting device according to one embodiment of the present invention comprises a solid strip having one end formed with a groove cooperative with a set screw mounted at the bottom of a flash unit. By fastening the set screw, the flash unit can be mounted on the solid strip which is in turn similarly connected to the camera. Alternatively, this connecting device according to other embodiments comprises a solid strip and an intermediate mounting mechanism. The intermediate mounting mechanism has a clamping head adapted to clamp the solid strip and at least one handle to which an external pushing force is applied to operate the clamping head.

22 Claims, 16 Drawing Figures

FIG. 1
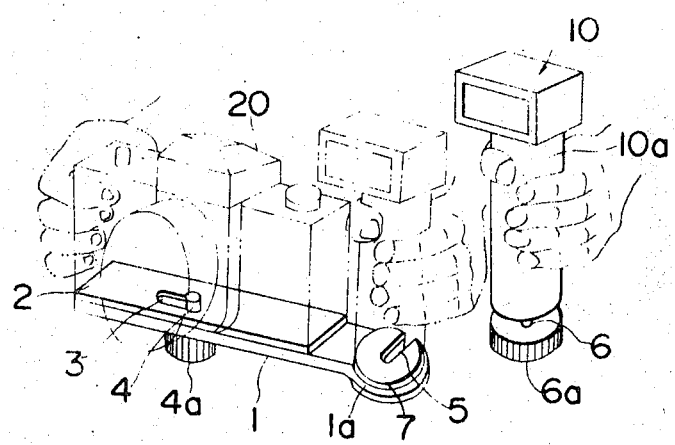
FIG. 2
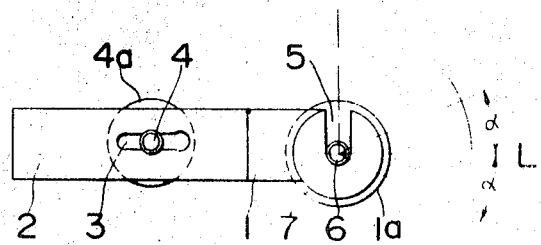
FIG. 3 (a)
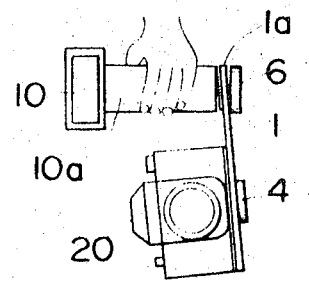
FIG. 3 (b)
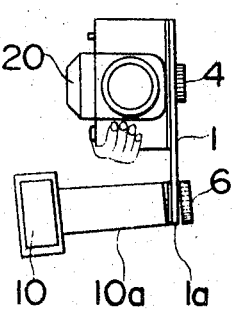
FIG. 3 (c)
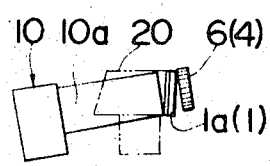
FIG. 3 (d)

CAMERA OUTFIT FOR CONNECTING A FLASH UNIT TO A PHOTOGRAPHIC CAMERA

The present invention relates to a camera outfit and, more particularly, to a device for connecting the body of a photographic camera, for example, a still, movie or television camera, and lighting equipment, for example, bulb flash unit, stroke flash unit or electrical lighting lamp.

It is to be noted that the connecting device herein disclosed according to the present invention can be utilized in any field of application if any one skilled in the art finds it suitable to use in his interested field. However, because the concept of the present invention originally developed from efforts made in the camera industry, description of the prior art and the present invention will be hereinafter made in connection with the connecting device as applied in connecting the body of a photographic camera to a flash unit.

It appears that most semi-professional or professional cameramen are fond of using one particular type of bulb or electronic flash unit, the one which comprises a substantially cylindrical flash stick, which may concurrently serve as a hand grip and a chamber for accommodating therein batteries and/or electrical circuit elements and has one end rigidly mounted with a flash device. A modern version of this particular type of flash unit is provided with a connecting device which comprises a solid strip having one end connected to a portion adjacent to the other end of the flash stick, either hingedly or by the use of a fitting screw, and a portion adjacent to the other end of said solid strip being adapted to be fitted to the bottom of a photographic camera by the aid of a fitting screw threadably extending therethrough into a threaded hole in the bottom of the photographic camera.

The conventional connecting device of the type above referred to does not provide flexibility of movement or positioning of the flash unit with respect to the body of the camera and, therefore, a photographer using such conventional connecting device for connecting the flash unit to the camera is often compelled to feel inconvenience in holding the camera on one hand and the flash unit on the other hand. By way of example, when it comes to a bounce lightening technique in which light emitted from the flash unit is bounced off the ceiling or like reflective surface during its travel from the flash unit to an object to be photographed, the photographer must detach the flash unit from the camera by undoing at least one of the fitting screws utilized to connect the camera and the flash unit. This is obviously troublesome and time-consuming work.

Accordingly, an essential object of the present invention is to provide an improved connecting device for use in connecting a photographic camera and a lightening equipment, which advantageously gives flexibility of movement of the lighting equipment with respect to the body of the camera, with substantial elimination of the inconveniences and disadvantages inherent in the conventional device.

Another important object of the present invention is to provide an improved connecting device of the type above referred to, which can be easily manufactured in a compact size and at relatively low costs.

According to one preferred embodiment of the present invention, the connecting device comprises an elongated solid strip of suitable length. This solid strip has one end portion formed with a through hole, through which a headed set screw extends for fitting the solid strip to the bottom of a photographic camera in any known manner, and the other end portion formed with a slot extending completely through said solid strip. A flash unit provided with a headed set screw threadably received by the body of said flash unit can be detachably mounted to said solid strip in such a way that a portion of the headed set screw between the head portion thereof and the body of the flash unit is inserted through said slot to the depth of said slot. If the length of that portion between the head portion of the headed set screw and the body of the flash unit is greater than the thickness of the solid strip, detachment and mounting of the flash unit to the solid strip can be readily performed without the flash unit, once mounted, being accidentally separated from said solid strip as will become clear in the subsequent description.

In another preferred embodiment of the present invention, a mounting mechanism is utilized to mount the flash unit to the solid strip or bracket. This mounting mechanism generally comprises a substantially cylindrical housing structure having a band with which the housing structure is secured to the flash unit. The housing structure includes a headed pin member having a head portion situated outside said housing structure and a stud portion of which is axially slidably situated within said housing structure, means for biasing said headed pin member in one direction with the head portion close to the housing structure in which condition the solid strip can be rigidly sandwiched between said head portion of said pin member and said housing structure, and means manually operable to move said pin member against said biasing means thereby to enable the solid strip to disengage from the mounting mechanism. In this arrangement, only by operating the manually operable means, the flash unit can be detached from the camera as desired and at any time the flash unit is to be angled with respect to an object to be photographed under the artificially lightened condition. This may be done either by separating the flash unit from the connecting device or by turning the flash unit in a desired direction about the axis of the pin member.

The mounting mechanism in the above preferred embodiment may be provided with a detent device for angularly positioning the flash unit. Alternately, this detent device may be provided on the side of the solid strip.

In any of the preferred embodiment of the present invention, if the type of flash unit to be utilized is an automatic strobe and this automatic strobe is provided with a photosensitive element away from the body of the strobe, and when the bounce lightening technique is to be practiced during actual taking of a picture; the photosensitive element can be correctly positioned towards the object to be photographed, irrespective of a tilt or angle of the flash unit. To this end, a mounting recess is formed in the solid strip at a position substantially intermediate between the bodies of the camera and flash unit.

Figure 5:
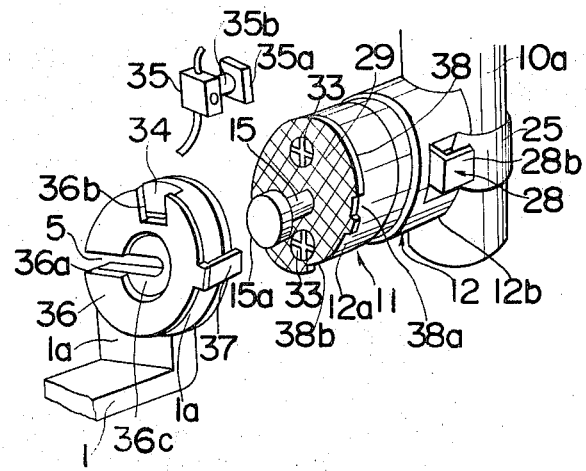
Figure 6:
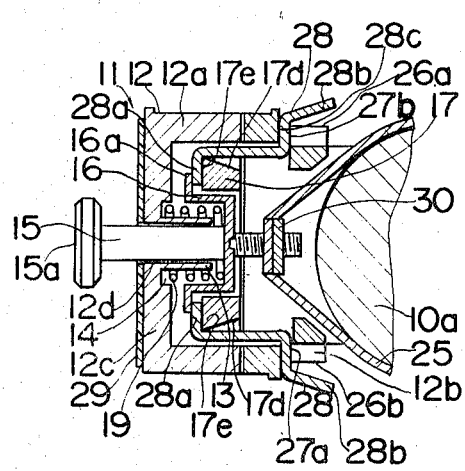
Figure 7:
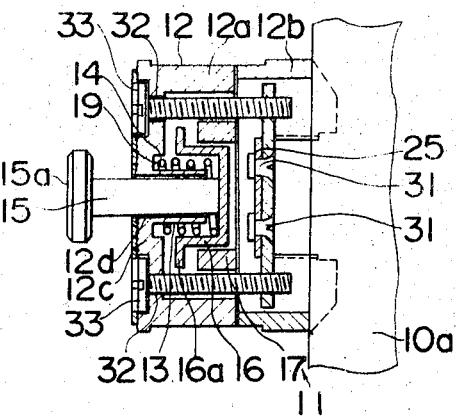
Figure 8:
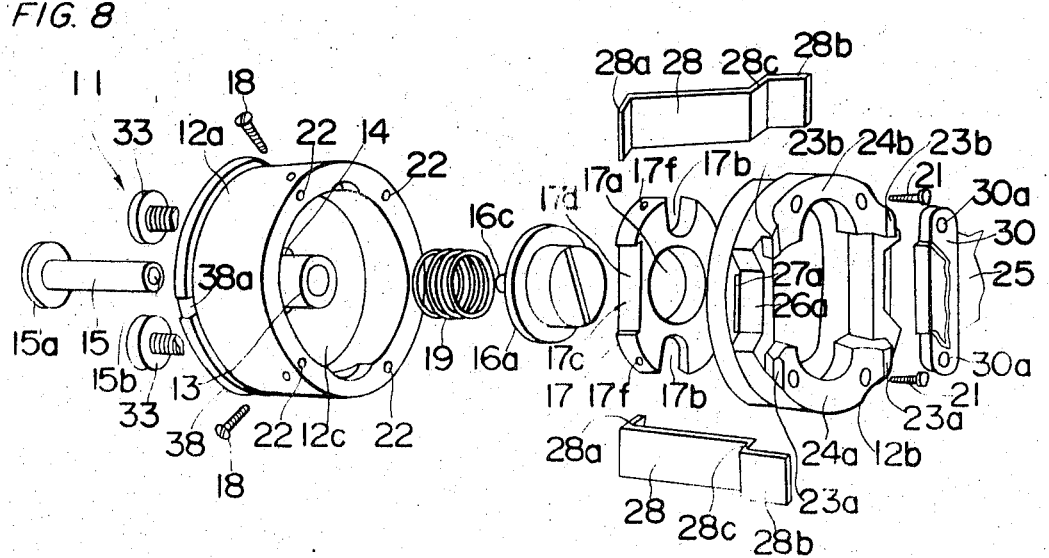
Figure 9:
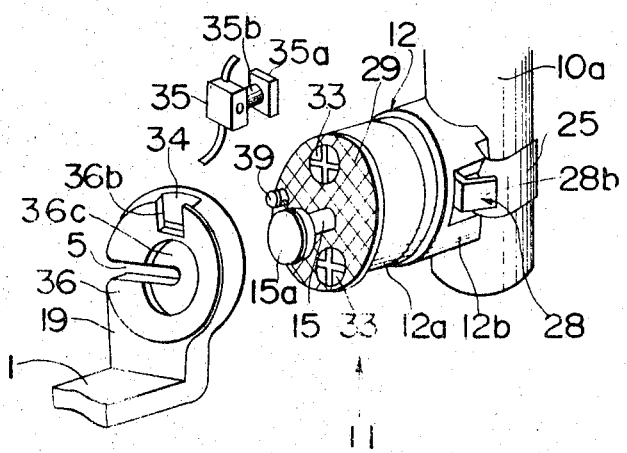
Figure 10:
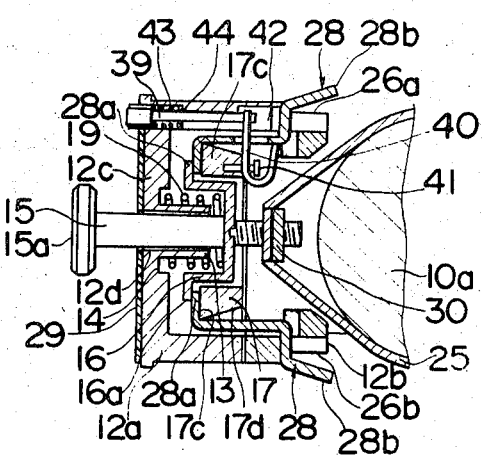
Figure 11:
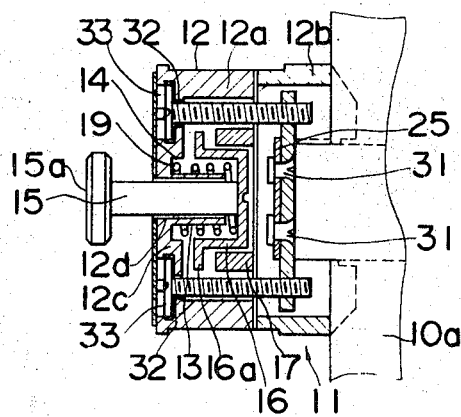
Figure 12:
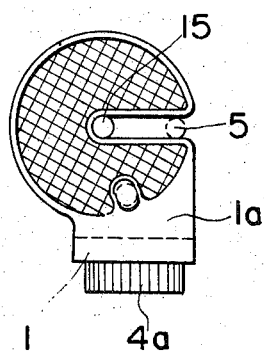
Figure 13:
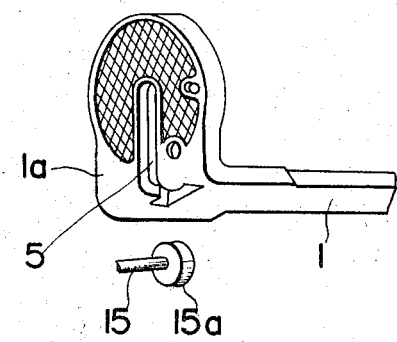

These and other objects and features of the present invention will become clear from the following description taken in conjunction with the preferred embodiments thereof with reference to the accompanying drawings, in which;

FIG. 1 is a schematic perspective view of a camera outfit in operation according to one preferred embodiment of the present invention, FIG. 2 is a top plan view of the camera outfit shown in FIG. 1, FIGS. 3 (A) to (C) illustrate various relations between a photographic camera and a flash unit, both connected to each other by the camera outfit of FIG. 1, in different shooting postures, FIG. 4 is a front elevational view of a combination of the photographic camera with flash unit connected thereto by means of a camera outfit constructed in accordance with another preferred embodiment of the present invention, FIG. 5 is a schematic perspective view of an essential portion of the camera outfit of FIG. 4, showing a mounting mechanism, FIG. 6 is a cross sectional view, on an enlarged scale, taken along the line VI—VI in FIG. 4, FIG. 7 is a side sectional view of FIG. 6, FIG. 8 is an exploded view of the mounting mechanism according to the second preferred embodiment of the present invention, FIG. 9 is a similar view to FIG. 5, but showing the mounting mechanism in a third preferred embodiment of the present invention, FIGS. 10 and 11 are similar views to FIGS. 6 and 7, respectively, showing the interior components of the mounting mechanism according to the third preferred embodiment of the present invention, FIG. 12 is an end view of a solid strip employed in the third preferred embodiment, and FIG. 13 is a perspective view of an end portion of the solid strip modified with respect to that shown in FIG. 12.

Before the description of the present invention proceeds, it is to be noted that, for the sake of brevity, like parts are designated by like reference numerals throughout the accompanying drawings.

Referring now to FIGS. 1 to 3, the camera outfit shown for connecting a flash unit 10 to a photographic camera 20 comprises a solid strip 1, preferably made of metallic material. This solid strip 1 has an upper surface plated with a rubber mat 2 on which the camera 20 seats.

For fitting the solid strip 1 to the bottom of the camera 20, a slot 3 is formed in the solid strip 1 at any position and, preferably, at a substantially intermediate portion thereof. A set screw 4 having a head portion 4a formed into an operating knob loosely extends through the slot 3, which is in turn engaged in a threaded hole (not shown) formed on the bottom of the camera 20, thereby fitting the solid strip 1 to the bottom of the camera 20.

The arrangement so far described is well understood by those skilled in the art with no substantial difficulty.

The solid strip has one end integrally formed into a substantially circular seat portion 1a and this seat portion 1a is formed with a groove 5 extending completely through the seat portion 1a and terminating at a position substantially in alignment with the center of the seat portion 1a. In FIGS. 1 and 2, the groove 5 is shown as extending substantially transversely of the lengthwise direction of the solid strip 1 and from the center of the seat portion 1a to the rear of the camera 20. However, by the reason as will become clear from the subsequent description, the groove 5 may be formed in the seat portion 1a in such a manner that, assuming that the angle of inclination or extension of the groove 5 on both sides of the imaginary line L passing in parallel relation to the lengthwise direction of the solid strip 1 across the center of the seat portion 1a is represented by $\alpha$ as shown in FIG. 2, this angle $\alpha$ should be equal to or greater than the angle of friction represented by $\tan^{-1}\mu$, wherein $\mu$ is a coefficient of friction between the wall of the groove 5 and the threaded portion of the set screw 6 in contact with the wall of said groove 5.

Mounted on an upper surface of the seat portion 1a is a rubber mat 7, which may be integral with the rubber mat 2 for giving a friction relative to the bottom of the flash stick 10a of the flash unit 10 when the latter is mounted thereon.

In practice, the set screw 6 provided on the side of the flash unit 10 need not be fastened securely with the seat portion 1a sandwiched between the operating knob 6a and the bottom of the flash stick 10a. The set screw 6 may be adjusted to give a space between said operating knob 6a and the bottom of the flash stick 10a of a size slightly greater than the sum of the thicknesses of the seat portion 1a and the rubber mat 7. If so adjusted, selective detachment and mounting of the flash unit with respect to the solid strip 1 can be readily performed, without the flash unit accidentally separating from said solid strip when the former is mounted on the latter. This is partly because of the particular arrangement of the groove 5 as hereinabove described and partly because of the reason hereinafter described with reference to FIGS. 3(A) to (D).

FIG. 3(A) illustrates that the camera 20 connected with the flash unit 10 by means of the solid strip 1 assumes the vertical position with the flash unit 10 horizontally supported by a photographer above said camera 20. In this condition, if the groove 5 is formed in the manner as hereinbefore described and even if the space between the knob 6a and the bottom of the flash stick 10a is slightly greater than the sum of the thicknesses of the seat portion 1a and the rubber mat 7 as hereinbefore described, the camera 20 will not fall down separating from the solid strip 1. As clearly illustrated, the solid strip 1 carrying the camera 20 tends to swing about the center thereof, through which the threaded portion of the set screw 6 extends, by the effect of the weight of the camera 20 with opposite portions on both sides of the seat portion 1a being respectively restrained by the bottom of the flash stick 10a and the operating knob 6a. Accordingly, the camera 20 suspended by the solid strip 1 can be steadily held in position without separating from the flash unit 10.

A similar description as set forth above may apply to FIGS. 3(B) to (D). FIG. 3(B) illustrates that the camera 20 assumes the vertical position supported by the photographer while the flash unit 10 horizontally extends below the camera 20. FIG. 3(C) illustrates that the camera 20 assumes the downwardly oriented position supported by the photographer while the flash unit 10 horizontally extends next to the camera 20. FIG. 3(D) illustrates that the camera 20 assumes the horizontal position with the flash unit 10 vertically supported by the photographer. Furthermore, the same description may apply where the camera 20 assumes any positions other than shown in FIG. 3.

From the foregoing, it has now become clear that the connecting device according to the above described embodiment of the present invention is very compact and easy to handle and provides flexibility to the flash unit when, for example, the bounce lightening technique is to be practised during an actual taking of a photographic picture.

The second preferred embodiment of the present invention is shown in FIGS. 4 to 8. It will be understood that, in this second preferred embodiment, the solid strip 1 is bent to provide the seat portion 1a in an upright position. The same configuration may be applied in the solid strip 1 in the foregoing embodiment, in which case the set screw 6 on the side of the flash unit 10 should be provided on a portion of the periphery of the flash stick 10a.

Referring now to FIGS. 4 to 8, the intermediate mounting mechanism which forms a part of fastening means for fastening the flash unit to the solid strip 1 is generally indicated by 11. The construction of this mounting mechanism 11 is illustrated in detail in FIGS. 6 to 8 and, therefore, reference is first made to FIGS. 6 to 8.

The mounting mechanism 11 is shown as comprising a substantially cylindrical housing structure 12 composed of a cap-like casing 12a, having one end closed by a wall 12c formed with a central opening 12d, and a hollow casing 12b. The casings 12a and 12b have different inner diameters, but may have the same outer diameters with respect to each other.

The wall 12c is integrally formed on its interior surface with a collar 13 axially extending in alignment with said opening 12d and terminating at a position adjacent to the plane of the open end extremity of said casing 12a. An annular groove 14 is formed on the interior surface of the wall 12c and outwardly around the collar 13 in coaxial relation to the longitudinal axis of said collar 13.

A plunger 15 having one end formed with a clamping head 15a and the other end formed with a threaded hole 15b axially inwardly extending in said plunger extends slidably through the opening 12d and then the collar 13, said other end thereof emerging from the collar 13 while situated within the casing 12a. The end of the plunger 15 situated within the casing 12a is mounted with a cap member 16 of substantially broad-brimmed hat-like shape having an annular brim portion 16a. As clearly shown in FIG. 8, the cap member 16 has an interior surface rigidly provided with a threaded stud 16c engageable into the threaded hole 15b so that the plunger 15 and the cap member 16 can be rigidly connected with each other. Alternatively, while the plunger 15 and the cap member 16 are integrally formed with each other, the clamping head 15a may be designed so as to be threadably mounted on the plunger 15.

The open end of the casing 12a is closed by a closure member 17 of a shape as will be described hereinafter. The closure member 17 has a central portion bored to provide a hole 17a of a diameter slightly greater than the outer diameter of the cap member 16 and in coaxial relation with respect to the longitudinal axis of the plunger 15, this hole 17a functioning to slidably support the cap member 16 and, hence, the plunger 15 in position within the casing 12a as clearly shown in FIGS. 6 and 7. In addition, for the purpose as will be mentioned later, this closure member 17 is formed with a pair of opposed cut-out portions generally indicated by 17b and also with a pair of opposed recesses generally indicated by 17c, only one of the latter being shown in FIG. 8. The recesses 17c have respective surfaces 17d made straight and inclined so as to intersect at a point outside the casing 12a and opposed to the plunger 15, as clearly shown in FIG. 6, thereby to provide individual fulcrums 17e for pivotal movement of respective levers. It is to be noted that the position of each cut-out portion 17b or recess 17c is substantially 90° angularly spaced from the position of either of the recesses 17c or the cut-out portions 17b, respectively.

The closure member 17 is held in position within the casing 12a by means of a plurality of set screws 18 engaged through the casing wall into respective holes 17f formed on the outer periphery of the closure member 17 in such a preferable manner that one surface of said member 17 lies on the same plane as the annular end face of the casing 12a while the other surface thereof situated within the casing 12a, with the bore 17a receiving therein the cap member 16.

Interposed between the interior surface of the wall 12c and that of the cap member 16 and mounted on the collar 13 is a compression spring 19 having one end seated in the groove 14 and the other end abutted against the cap member 16 whereby the cap member 16 and, hence, the plunger 15 is normally biased to the right with the clamping head 15a close to the outer surface of the wall 12c. The plunger 15 can slide to the left against the compression spring 19 only when an external pushing force is applied to the cap member 16 as will be described later.

Referring still to FIGS. 6 to 8, the hollow casing 12b is secured to the open end of the cap-like casing 12a, constructed in the manner as hereinbefore described with the various components mounted therein, by means of a plurality of elongated screws 21 spacedly extending through the hollow casing 12b in parallel with the longitudinal axis of the housing structure 11 and engaged into corresponding holes 22 formed on the open end face of the casing 12a. The other end of this casing 12b is formed with two pair of opposed legs 23a and 23b, each pair of these legs being connected with an axially inwardly curved surface 24a and 24b, respectively, the curvature of this surface 24a and 24b being dependent on the cross section of the flash stick 10a so that the it fits to the periphery of the flash stick 10a as clearly illustrated in FIG. 5. The space between the pairs of these legs 23a and 23b depends on the width of a band 25 used to encircle the flash stick 10a thereby to connect the mounting mechanism to the flash unit 10.

The hollow casing 12b is also formed with a pair of opposed side recesses 26a and 26b for providing respective clearances in which the levers move as will be described later. In addition, this hollow casing is formed with a pair of rectangular openings 27a and 27b opposed with respect to each other on a substantially intermediate portion of the periphery of said hollow casing 12b and in the vicinity of the corresponding side recesses 26a and 26b.

The levers above referred to are generally designated by 28 and respectively shaped as shown in FIGS. 6 and 8. These levers 28 are of the same construction and symmetrically arranged with respect to the longitudinal axis of the housing structure 11 and, accordingly, for the sake of brevity, only one will be hereinafter described in detail.

The lever 28 is made of an elongated metallic strip having one end bent to provide a finger 28a which functions to transmit the external pushing force to the cap-like member 16, and the other end formed to provide a handle 28b to which the external pushing force is to be applied. A portion adjacent to the handle 28b is as shown, bent in a substantially Z-shape thereby to provide an engagement as indicated by 28c.

While constructed in the above arrangement, each lever 28 is disposed in the housing structure 11 in such a manner that the finger 28a is sandwiched between the brim 16a of the cap-like member 16 and an annular surface of the closure member 17 facing towards the wall 12c and the handle 28b is situated outside the housing structure 11 with a portion adjacent to the engagement 28c loosely extending through the corresponding rectangular opening 27a or 27b.

It has now become clear that, in the arrangement so far described, if the external pushing force is applied to the handles 28b in the opposite directions from the outside, the levers 28 pivot about the respective fulcrums 17d formed in the closure member 17 with the fingers 28a causing the cap-like member 16 to move against the compression spring 19. Therefore, the plunger 15 is moved to the left against the compression spring 19 with the clamping head 15a remote from the wall 12c of the housing structure 12. So long as the external pushing force is not applied to the handles 28b, the plunger 15 is biased to the right by the action of the compression spring 19 and, thus, the cap-like member 16 is pressed against the closure member 17 with the brim 16a pressing the fingers 28a of the respective levers 28, this condition being illustrated in FIG. 6.

The outer surface of the wall 12c of the housing structure 12 may be covered with a protective sheet 29 over the whole surface thereof, which may be made of synthetic or natural rubber material.

For connecting the mounting mechanism 11 to the flash unit 10 in such a manner as shown in FIG. 4, band 25 is provided as hereinbefore described. This band 25 is made of elastic material, either metallic or synthetic, in the form of an elongated strip having both ends thereof connected with each other in such a manner as hereinafter described.

Both the ends of the band 25 are connected to a fitting piece 30 by any suitable method, for example, by the use of a pair of caulking pins 31 as seen in FIG. 7. The fitting piece 30 is formed with a pair of threaded holes 30a adjacent to both the ends thereof and on both sides of the band 25 fitted thereto. The fitting piece 30 is of a size sufficient enough to enter into the interior of the hollow casing 12b and is adapted to be supported by the housing structure 12 in such a manner as hereinafter described.

As clearly shown, the wall 12c of the casing 12a is formed with a pair of holes 32, 180° spaced about the center thereof with respect to each other and in alignment with the corresponding cut-out portions 17b in the closure member 17. A pair of flat-headed screws 33 extend through these holes 32 and then the cut-out portions 17b in parallel relation to each other and to the longitudinal axis of the housing structure 12, respectively, and are in turn engaged into the threaded holes 30a in the fitting piece 30. It is to be noted that each of the holes 32 in the wall 12c has a diameter greater than that of the corresponding flat-headed screw 33 so that adjustment of these screws 33 causes the fitting piece 30 to move in either direction. By way of example, after the flash stick 10a has been inserted through the band 25 and if these screws 33 are simultaneously fastened, the fitting piece 30 moves to the left, i.e., towards the interior of the housing structure 12, thus permitting the flash stick 10a to be drawn towards the mounting mechanism 11. This is the condition in which the mounting mechanism 11 is secured to the flash unit 10.

Referring back to FIG. 5, the circular seat portion 1a of the solid strip 1 is formed with a recess 34. The position of this recess 34 on the circular seat portion 1a is such that, when a photosensitive element 35 is mounted in said recess 34 in a manner as will be mentioned later, rays of light having emitted from the flash unit 10 and reflected on the object to be photographed are detached by said photosensitive element 35 irrespective of the angle of inclination of the flash unit 10 relative to the shooting direction of the photographic camera 20. The photosensitive element 35 herein employed should be understood as functioning to control the operation of the flash unit 10 in response to the amount of light reflected on the object to be photographed and sensed thereby. In order to enable the photosensitive element 35 to be mounted on the solid strip 1, an substantially annular plate member 35 formed with a split portion as at 36a and a cut-out portion as at 36b is secured to one surface of the seat portion 1a facing opposite to the housing structure 12 by any suitable method such as by the use of an adhesive material or screws. The diameter of the inner bore of this annular plate member 35, such as indicated by 36c is substantially equal to the diameter of the clamping head 15a on the plunger 15 and the width of the cut-out portion 36b is smaller than that of the recess 34. On the other hand, the photosensitive element is provided with a stand 35a which is connected there-with through a post 35b and is shaped to fit into said recess 34.

In the arrangement so far described, engagement between the solid strip 1 and the mounting mechanism 11 can be carried out in the following manner: Assuming that the external pushing force is applied to the handles 28b so as to move towards each other thereby to project the plunger 15, the space between the outer surface of the wall 12c and the corresponding surface of the clamping head 15a becomes greater than the sum of the thicknesses of the seat portion 1a and the plate member 36. In this condition, a portion of the plunger 15 within such space is ready to be inserted through the groove 5 in the seat portion while the clamping head 15a and the wall 12c of the housing structure 12 are situated on both sides of the seat portions 1a, respectively. At the time the external pushing force is released after the mounting mechanism 11 has been coupled in the matter as hereinbefore described, the plunger 15 is retracted by the action of the compression spring 19 with the clamping head 15a seated within the bore 36c in contact with the outer surface of the seat portion 1a, thereby firmly connecting the flash unit 10 to the solid strip 1.

It is to be noted that the clamping force exerted by the clamping head 15a should be sufficient enough to avoid relative rotation of the mounting mechanism 11, carrying the flash unit 10, with respect to the seat portion 1a. This can be achieved by employing the compression spring 19 of suitable resiliency and concurrently employing the rubber mat 29 which provides a friction between the wall 12c and the seat portion 1a. However, the resiliency of the compression spring 19 which may be employed is limited, or otherwise the external pushing required to be applied to the handles 128a will be considerable. Under this circumstance, in order to ensure that the flash unit is firmly positioned with respect to the shooting direction of the camera 20, the detent device is employed which will be hereinafter described.

In the embodiment shown in FIG. 5, the detent device comprises a nail member 37 integrally formed with plate member 36 and bent across the thickness of the seat portion 1a facing towards the mounting mechanism 11.

On the other hand, at the end adjacent to the wall 12c, the casing 12a is integrally formed with a radially outwardly extending flange 38. Cooperative with the nail member 37 on the plate member 36 are a plurality of engagement recesses all formed in the flange 38; one of which, such as designated by 38a, is of a length substantially equal to the width of the nail member 37 and located at such a position as to permit the flash unit to be directed towards the shooting direction of the camera and the other engagement recess 38b having a length greater than the engagement recess 38a is located at such a position as to permit the flash unit 10 to be upwardly directed diverging from the shooting direction of the camera 20. As shown in FIG. 4, this nail member 37 is, so long as the flash unit 10 is directed towards the shooting direction of the camera 20, engaged in the engagement recess 38a. When the bounce lighting technique is to be practised, i.e., when the flash unit 10 is to be upwardly directed diverging from the shooting direction of the camera 20, what is necessary is to apply the external pushing force to the handles 28a to release the seat portion 1a, that has been clamped between the clamping head 15a and the wall 12c of the housing structure 12, and then permit the nail member 37 to ride over on to the other engagement recess 38b while the flash stick 10a is rotated about the axis of the plunger 15.

In the embodiment shown in FIGS. 9 to 11, the detent device comprises a pin member 39 slidably extending through a peripheral wall of the casing 12a and having an outer end adapted to engage with the seat portion 1a as will be described later and the other inner end connected with a spring plate 40 of substantially J-shape pivotally secured to the closure member 17 by means of a set screw 41. As indicated by 42 in FIG. 10, the casing 12a is formed in its peripheral wall adjacent to the open end thereof with a recess for providing a clearance in which the inner end of the pin member 39 and the spring plate 40 move. As clearly shown, the spring plate 40 has one end connected pivotally with the inner end of the pin member 39 and the other end in contact with a portion of the lever 28 so that depression of the lever 28 caused by the application of the external pushing force thereto causes the spring plate 40 to pivot with the first mentioned end thereof drawing the pin member 39 to the right. In order to permit the pin member 39 to return to a position in which the outer end thereof projects outwards from the housing structure 12, a compression spring 43 is accommodated in a recess 44 and acts to bias the pin member 39 to move to the left with the outer end thereof outwardly projected from the housing structure 12.

As can be understood from FIG. 9, the pin member 39 is positioned such that, when the flash unit 10 is coupled to the seat portion 1a with the flash stick 1a in a vertical position, the outer end of said pin member 39 is situated in the groove 5 in the seat portion 1a, thereby to prevent the flash unit 10 from accidentally or arbitrarily rotating about the longitudinal axis of the plunger 15.

A blind hole 46 cooperative with the outer end of the pin member 39 may be formed on the surface of the seat portion 1a, which faces the housing structure 12, in an angularly spaced relation with respect to the groove 5 about the center of said seat portion 15. Preferably, this blind hole 46 is apaced about 60° from the groove 5 so that rays of light emitted from the flash unit 10 travel at an angle of 60° upwardly with respect to the shooting direction of the camera 20. The reason for this particular angle is because, during bounce lightening, it is considered typical to direct the rays of light from the flash unit 10 towards the ceiling at such angle, although this angle varies in practice depending upon the distance between the camera 20 and the object to be photographed.

The position of the groove 5 in the seat portion 1a of the solid strip 1 may be modified such as shown in FIG. 13. In FIG. 13, the groove 5 extends vertically, i.e., at right angles to the plane of the solid strip 1, so that the flash unit 10 mounted with the mounting mechanism can be coupled to the solid strip 1 from bottom. To this end, one end of the groove 5 adjacent to the solid strip 1 is shaped so as to accommodate therein the clamping head 15a as clearly shown in FIG. 13. In addition, in order to maintain the flash unit in the vertical position, another blind hole is formed as at 47.

In the embodiments shown in FIGS. 9 to 11 and FIG. 13, it is clear that, when the external pushing force is applied to the handles 28a in substantially the same manner as in the first embodiment, the pin member 39 is inwardly retracted with the inner end thereof pulled by the pivoting spring plate 40 to the right as viewed from FIG. 10. Release of the external pushing force permits the pin member to move to the left with the outer end thereof outwardly projected.

Although the present invention has been fully described by way of the preferred embodiments thereof with reference to the accompanying drawings, it is obvious that various changes and modifications are apparent to those skilled in the art. For example, the mounting mechanism 11 may be connected to the bottom of the flash stick 10a by means of a screwing method if it is desired to be used in association with the solid strip of the type shown in FIGS. 1 and 2. In addition, as shown in FIGS. 12 and 13, the surface of the seat portion 1a facing towards the housing structure 12 may be applied with a rubber covering to provide a more reliable friction to the relative rotation of the mounting mechanism 11 with respect to the seat portion 1a. Furthermore, the outer periphery of the housing structure 12 may be used as a take-up spool around which a length of cord 48, used to electrically connect the flash unit 10 to the camera 20 with or without the photosensitive element 35 disposed on said cord 48, as clearly shown in FIG. 4.

What is claimed is:

1. A connecting device for connecting detachably between a flash unit and a photographic camera, comprising: a solid strip, means formed in said solid strip for securing said solid strip to said camera, a groove formed at one end of said solid strip, and means for mounting said flash unit to said groove, said groove extending completely through said solid strip, said mounting means having one end formed with a head portion and the other end engaged to said flash unit, a substantially intermediate portion thereof being adapted to be inserted through said groove when said flash unit is to be mounted to said solid strip.

2. A connecting device as claimed in claim 1, wherein said mounting means comprises a set screw having one end formed with a head portion and the other end threadably engaged to said flash unit, a substantially intermediate portion of which is adapted to be inserted through said groove when said flash unit is to be mounted on said solid strip.

3. A connecting device as claimed in claim 2, wherein at least one surface of the solid strip adjacent to the groove and facing towards said head portion of said set screw is provided with a rubber covering for providing a friction relative to said head portion.

4. A connecting device as claimed in claim 2, wherein said groove rearwardly extends with respect to the camera at an angle on both sides of an imaginary line passing in parallel relation to the lengthwise direction of the solid strip, said angle being equal to or greater than the angle of friction represented by $\tan^{-1}/\mu$, wherein $/\mu$ is a coefficient of friction between the wall defining said groove and said substantially intermediate portion of said set screw that has been inserted in said groove.

5. A connecting device for connecting detachably between a flash unit and a photographic camera, which comprises; a solid strip having one end curved at right angles to provide an upright seat portion; means formed in said solid strip for securing said strip to said camera; a groove formed in said seat portion of said solid strip and extending completely through said seat portion; and means for mounting said flash unit to said groove comprised of a housing structure having one end closed by a wall, a plunger having one end formed with a substantially circular clamping head and the other end situated wtihin said housing structure, a substantially intermediate portion of which slidably extends through said wall, and means manually operable to move said plunger with said clamping head away from said wall thereby to permit a portion of said plunger between said clamping head and said wall to be relatively inserted through said groove in said seat portion of said solid strip, said manually operable means, when inactive, permitting said clamping head to clamp said seat portion between said clamping head and said wall of said housing structure.

6. A connecting device as claimed in claim 5, wherein said mounting means further comprises means for fastening said housing structure to said flash unit.

7. A connecting device as claimed in claim 5, wherein said groove in said seat portion has one end situated in alignment with the center of said seat portion and the other end situated rearwards of said camera mounted on said solid strip.

8. A connecting device as claimed in claim 5, wherein said groove in said seat portion has one end situated in alignment with the center of said seat portion and the other end situated at the bent portion between the body of said solid strip and said upright seat portion, said groove extending in the direction intersecting the lengthwise direction of said solid strip.

9. A connecting device as claimed in claim 5, wherein said seat portion is formed with a recess for receiving a photosensitive element adaptable for controlling the operation of the flash unit, said photosensitive element being held in position to face towards an object to be photographed irrespective of the angle of inclination of said flash unit with respect to the shooting direction of the camera.

10. A connecting device as claimed in claim 6, wherein said fastening means comprises a band adapted to encircle a flash stick of said flash unit, and a fitting piece to which both ends of said band are connected, said fitting piece being adjustably accommodated within said housing structure for adjustment of a fastening force exterted by said band.

11. A connecting device as claimed in claim 10, wherein said band comprises an elastic metallic material.

12. A connecting device as claimed in claim 5, wherein said mounting means further comprises means for selectively positioning said flash unit so as to permit the direction of travel of rays of light emitted from said flash unit to upwardly diverge from the shooting direction of the camera.

13. A connecting device for connecting detachably between a flash unit and a photographic camera, which comprises: a solid strip having one end curved at right angles to provide an upright seat portion; means formed in said solid strip for securing said solid strip to said camera; a groove formed in said seat portion of said solid strip and extending completely through said seat portion; and means for mounting said flash unit to said groove which includes a housing structure having one end closed by a wall, a plunger having one end formed with a substantially circular clamping head and the other end situated within said housing, a substantially intermediate portion of which slidably extends through said wall, means for biasing said plunger in one direction with said clamping head close to said wall, and means manually operable to move said plunger in the opposite direction against said biasing means with said clamping head remote from said wall thereby to permit a portion of said plunger between said clamping head and said wall to be relatively inserted through said groove in said seat portion of said solid strip, said manually operable means, when not in operation, permitting said clamping head to clamp said seat portion between said clamping head and said wall of said housing structure.

14. A connecting device as claimed in claim 13, further comprising means for fastening said housing structure to said flash unit in a detachable manner.

15. A connecting device as claimed in claim 14, wherein said fastening means comprises a band adapted to encircle a flash stick of said flash unit, and a fitting piece to which both ends of said band are connected, said fitting piece being adjustably accommodated within said housing structure for adjustment of a fastening force exerted by said band.

16. A connecting device as claimed in claim 15, wherein said band comprises a metallic material having sufficient resiliency.

17. A connecting device as claimed in claim 14, further comprising means for selectively positioning said flash unit so as to permit the direction of travel of rays of light emitted from said flash unit to upwardly diverge from the shooting direction of the camera.

18. A connecting device as claimed in claim 17, wherein said selectively positioning means comprises a pin member slidably accommodated in a wall of said housing structure and having one end operatively connected with said manually operable means, at least one detent hole formed on one surface of said seat portion facing towards said housing structure, into which the other end of said pin member is collapsibly engageable, and means for biasing said pin member in one direction, engagement of said other end of said pin member into said blind hole being effected by said biasing means while disengagement thereof from said blind hole being effected only when said manually operable means is operated.

19. A connected device as claimed in claim 17, wherein said selectively positioning means comprises a plate member of split ring shape secured to one surface of said seat portion facing opposite to said housing structure, said plate member having a nail member integrally formed therewtih, and at least one detent recess formed in said housing structure for engagement with said nail member.

20. A connecting device as claimed in claim 13, wherein said groove in said seat portion has one end situated in alignment with the center of said seat portion and the other end situated rearwards of said camera mounted on said solid strip.

21. A connecting device as claimed in claim 13, wherein said groove in said seat portion has one end situated in alignment with the center of said seat portion and the other end situated at the bent portion between the body of said solid strip and said upright seat portion, said groove extending in the direction intersecting the lengthwise direction of said solid strip.

22. A connecting device as claimed in claim 13, wherein said seat portion is formed with a recess for receiving a photosensitive element adapted for controlling the operation of the flash unit, said photosensitive element being held in position to face towards an object to be photographed irrespective of the angle of inclination of said flash unit with respect to the shooting direction of the camera.

* * * * *